(12) United States Patent
Kojima et al.

(10) Patent No.: US 8,740,280 B2
(45) Date of Patent: *Jun. 3, 2014

(54) VEHICLE SEAT SLIDE DEVICE (75) Inventors: Yasuhiro Kojima, West Bloomfield, MI (US); Hideo Nihonmatsu, Anjo (JP); Yoshihisa Hori, Gifu (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,148

(22) Filed: Sep. 4, 2012

(65) Prior Publication Data
US 2012/0326000 A1 Dec. 27, 2012

Related U.S. Application Data (63) Continuation of application No. 12/675,435, filed as application No. PCT/JP2008/068265 on Oct. 8, 2008, now Pat. No. 8,282,151.

(30) Foreign Application Priority Data

Oct. 11, 2007 (JP) .................. 2007-265450

(51) Int. Cl.
*B60N 2/07* (2006.01)
(52) U.S. Cl.
USPC .............. 296/65.13; 248/429; 297/344.11
(58) Field of Classification Search
USPC .............. 296/65.13, 65.14; 248/429, 430; 297/344.11
See application file for complete search history.

(56) References Cited

U.S. PATENT DOCUMENTS

| 7,993,060 | B2 | 8/2011 | Kojima et al. |
| 8,033,520 | B2 | 10/2011 | Fujieda et al. |
| 2005/0224680 | A1 | 10/2005 | Strubel et al. |
| 2006/0249644 | A1 | 11/2006 | Folliot et al. |
| 2009/0080814 | A1 | 3/2009 | Kojima et al. |
| 2009/0236488 | A1 | 9/2009 | Koga et al. |
| 2010/0207419 | A1 | 8/2010 | Kojima et al. |
| 2010/0314523 | A1 | 12/2010 | Kojima et al. |
| 2011/0024595 | A1 | 2/2011 | Oi et al. |
| 2011/0101194 | A1 | 5/2011 | Wetzig et al. |

(Continued)

FOREIGN PATENT DOCUMENTS

| JP | 6 35029 | 5/1994 |
| JP | 6 36452 | 5/1994 |
| JP | 7 30133 | 6/1995 |
| JP | 2834963 B2 | 10/1998 |

(Continued)

OTHER PUBLICATIONS

Office Action issued Aug. 7, 2012 in Japanese Application No. 2009-537002, filed Oct. 22, 2009 (w/Partial English Translation).

*Primary Examiner* — Jason S Morrow
(74) *Attorney, Agent, or Firm* — Oblon, Spivak, McClelland, Maier & Neustadt, L.L.P.

(57) ABSTRACT

A stopper includes an attachment portion and a pair of flanges. The attachment portion contacts an outer surface of a bottom wall portion of a lower rail and is attached to the bottom wall portion. The flanges extend from the attachment portion to be passed through insertion holes in the bottom wall portion. The flanges are located in an inner space of the lower rail. The flanges are engaged with second cut-and-raised pieces formed in an upper rail, thereby limiting the range of movement of the upper rail relative to the lower rail.

15 Claims, 7 Drawing Sheets

(56) References Cited

U.S. PATENT DOCUMENTS

| | | |
|---|---|---|
| 2011/0139954 A1 | 6/2011 | Ruess et al. |
| 2011/0233366 A1 | 9/2011 | Mizuno et al. |
| 2011/0233367 A1 | 9/2011 | Mizuno et al. |
| 2011/0233369 A1 | 9/2011 | Nihonmatsu et al. |
| 2013/0200243 A1* | 8/2013 | Mischer et al. ............... 248/429 |

FOREIGN PATENT DOCUMENTS

| | | |
|---|---|---|
| JP | 2003 102576 | 4/2003 |
| JP | 2006 15804 | 1/2006 |
| JP | 2006 298104 | 11/2006 |
| JP | 2007 137291 | 6/2007 |

* cited by examiner

VEHICLE SEAT SLIDE DEVICE

CROSS-REFERENCE TO RELATED APPLICATIONS

This application is a Continuation of application Ser. No. 12/675,435, filed Feb. 26, 2010, now U.S. Pat. No. 8,282,151, the entire content of which is incorporated herein by reference. U.S. Ser. No. 12/675,435 is a national stage of PCT/JP08/068,265 filed Oct. 8, 2008. This application also claims priority to Japanese Patent Application No. 2007-265450, filed Oct. 11, 2007.

TECHNICAL FIELD

The present invention relates to a vehicle seat slide device.

BACKGROUND ART

Conventionally, various types of vehicle seat slide devices have been proposed. For example, a vehicle seat device disclosed in Patent Document 1 includes a pair of lower rails fixed on a vehicle floor and a pair of upper rails fixed to a seat. The upper rails are supported by the lower rail to be movable relative to the lower rails. Each lower rail has a pair of plate-like stoppers at a center portion in the longitudinal direction. The stoppers are formed by cutting and raising parts of the bottom wall portion of the lower rail. On the other hand, each upper rail has a pair of plate-like stoppers at either end in the longitudinal direction. The stoppers are formed by cutting and raising parts of the vertical wall portions of the upper rail. The stoppers at each end of the upper rails can contact and be engaged with the stoppers of the lower rails along the moving direction of the upper rails, so that the range of movement (slide stroke) of the upper rails relative to the lower rails is limited.

In contrast, in a vehicle seat slide device disclosed in Patent Document 2, an L-shaped stopper bracket is fixed to an upper rail, while a pin is fixed to a lower rail by swaging. The movement range of the upper rail relative to the lower rail is limited by causing the stopper bracket to contact the pin.

According to the vehicle seat slide device of Patent Document 1, even if the dimensions of the rails are the same, the positions of the stoppers, which are cut and raised from the lower rails and the upper rails, need to be changed in order to change the movement range of the upper rails relative to the lower rails. Thus, the rails need to be manufactured as specialized parts that have been subjected to a process (cutting) in accordance with a desired movement range. In other words, as lower rails and upper rails, multiple types of parts, which have been subjected to different processes in accordance with various movement ranges, need to be prepared.

On the other hand, according to the vehicle seat slide device of Patent Document 2, a separately formed stopper bracket is attached to and fixed to an upper rail. Thus, the movement range of the upper rail relative to the lower rail is easily changed. However, since the stopper bracket needs to be attached from the inside of the upper rail, which has a substantially U-shaped cross section, the installment of the stopper bracket is troublesome.

Patent Document 1: Japanese Laid-Open Patent Publication No. 2006-298104

Patent Document 2: Japanese Laid-Open Patent Publication No. 2006-15804

DISCLOSURE OF THE INVENTION

Accordingly, it is an objective of the present invention to provide a vehicle seat slide device that is capable of adding to the flexibility of settings of the range of relative movement of rails, and allows stoppers to be easily attached to rails.

To achieve the foregoing objective and in accordance with one aspect of the present invention, a seat slide device including a first rail, a second rail, a first stopper, and a second stopper is provided. The first rail is adapted to be fixed to one of a vehicle floor and a vehicle seat, and includes a wall portion having an insertion hole. The second rail is adapted to be fixed to the other one of the vehicle floor and the vehicle seat. The second rail is assembled to the first rail so as to be movable relative to the first rail, and cooperates with the first rail to form an inner space. The first stopper has an attachment portion and a movement limiting portion. The attachment portion contacts an outer surface of the wall portion of the first rail to be attached to the wall portion. The movement limiting portion extends from the attachment portion through the insertion hole to be located in the inner space. A second stopper is provided on the second rail. The movement limiting portion is arranged to be contactable with the second stopper in a direction of relative movement between the first rail and the second rail. By being engaged with the second stopper, the movement limiting portion limits a relative movement range of the first and second rails.

Since the insertion hole is formed at an arbitrary position of the first rail in the longitudinal direction, the above described configuration adds to the flexibility of settings of the range of relative movement of the rails. Further, since the first stopper can be attached from the outside of the first rail, the first stopper is easily installed without being interfered by the second rail even when the first stopper is assembled to the first rail after the first and second rails are installed.

In accordance with one aspect of the present invention, the wall portion of the first rail has an inner surface located in the inner space, and the movement limiting portion is structured so as to contact the inner surface of the wall portion on a side opposite to the second stopper in the direction of the relative movement between the first and second rails.

When the movement limiting portion is engaged with the second stopper, a moment is generated in the movement limiting portion, which moment acts to rotate, toward the wall portion, a portion of the movement limiting portion on a side opposite to the second stopper. However, the moment is borne by contact between the portion of the movement limiting portion on a side opposite to the second stopper and the inner surface of the wall portion of the first rail. This allows the movement limiting portion to reliably bear the load generated by the engagement with the second stopper in a shearing direction. Thus, the strength of the first stopper is sufficiently increased by a simple structure.

In accordance with one aspect of the present invention, the insertion hole is one of a pair of insertion holes arranged in a widthwise direction of the first rail, and the movement limiting portion includes a pair of plate-like flanges, each of which is passed through one of the insertion holes and extends along the direction of the relative movement between the first and second rails.

According to this configuration, the plate-like flanges having an extremely simple shape can be employed as the movement limiting portion.

In accordance with one aspect of the present invention, the attachment portion is formed like a plate and has side edges in a direction intersecting the direction of the relative movement between the first and second rails, and each flange is bent in relation to the attachment portion so as to extend from the corresponding side edge of the attachment portion and to be passed through the corresponding insertion hole.

According to this configuration, the plate-like attachment portion reduces the projecting amount of the attachment portion in relation to the first rail. Also, since the attachment portion and the flanges are formed by bending a plate, the first stopper having a simple structure can be formed easily.

In accordance with one aspect of the present invention, the attachment portion includes an extended piece that extends toward the second stopper beyond a contact position at which the flanges contact the second stopper.

According to this configuration, when the flanges and the second stopper are engaged with each other, a moment is generated in the flanges, which moment acts to rotate a portion on a side contacting the second stopper in a direction away from the wall portion. However, the moment is borne by contact between the extended piece and the outer surface of the wall portion of the first rail. Therefore, the flanges are capable of more reliably bearing the load generated by the engagement with the second stopper in a shearing direction.

In accordance with one aspect of the present invention, the attachment portion is fastened at the extended piece to the wall portion of the first rail by means of a fastening member.

According to this configuration, when the flanges and the second stopper are engaged with each other, the extended piece is pressed against the outer surface of the wall portion of the first rail. Therefore, the fastening member does not bear the load in a tensile direction. Thus, the required strength of the fastening member is reduced, which allows the structure of the fastening member to be simplified.

In accordance with one aspect of the present invention, the movement limiting portion is structured to contact an existing portion provided on the first rail at a side opposite to the second stopper in the direction of the relative movement between the first and second rails.

According to this configuration, the load generated by the engagement between the movement limiting portion and the second stopper is borne by both of the movement limiting portion and the existing portion in a dispersed manner. Thus, the required strength of the movement limiting portion (the first stopper) is reduced, which allows the structure of the movement limiting portion to be simplified.

In accordance with one aspect of the present invention, the insertion hole is one of a pair of insertion holes arranged in a widthwise direction of the first rail. The attachment portion is formed like a plate and has side edges in a direction perpendicular to the direction of the relative movement between the first and second rails. The movement limiting portion includes a pair of plate-like flanges extending along the direction of the relative movement between the first and second rails. Each flange is bent in relation to the attachment portion so as to extend from the corresponding side edge of the attachment portion and to be passed through the corresponding insertion hole. The attachment portion includes a pair of extended pieces extending from opposite sides in the direction of the relative movement between the first and second rails and beyond the flanges. The extended pieces contact the outer surface of the wall portion of the first rail.

In accordance with one aspect of the present invention, the attachment portion is fastened at the extended pieces to the wall portion of the first rail by means of fastening members, and the attachment portion is fitted to the wall portion of the first rail by means of a projection/recess fitting structure between the extended pieces.

In accordance with one aspect of the present invention, the attachment portion is fastened at a portion between the extended pieces to the wall portion of the first rail by means of a fastening member, and the attachment portion is fitted to the wall portion of the first rail by means of a projection/recess fitting structure at each of the extended pieces.

In accordance with one aspect of the present invention, the projection/recess fitting structure includes a recess formed in the wall portion of the first rail and a projection formed on the attachment portion to be fitted in the recess.

BRIEF DESCRIPTION OF THE DRAWINGS

FIGS. 3(*a*) and 13(*b*) are side views of the seat slide device shown in FIG. 1;

FIG. 3(*c*) is a partially enlarged view of FIG. 3(*a*);

FIGS. 6(*a*) and 6(*b*) are side views illustrating a seat slide device according to a second embodiment of the present invention;

FIG. 6(*c*) is a partial enlarged view of FIG. 6(*a*);

BEST MODE FOR CARRYING OUT THE INVENTION

A first embodiment of the present invention will now be described with reference to the drawings.

Figure 1:
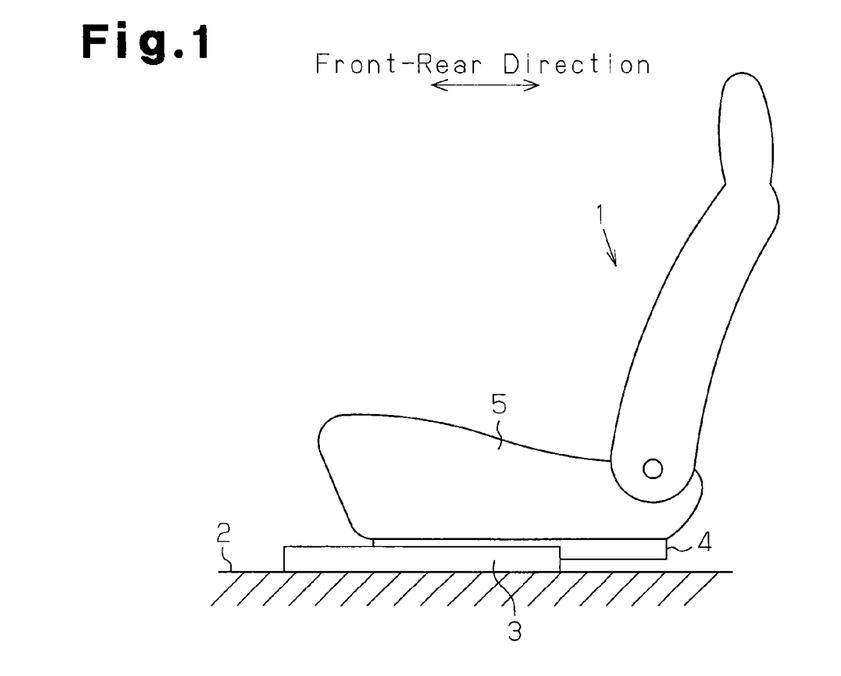
FIG. 1 is a side view illustrating a vehicle seat on which a seat slide device according to a first embodiment of the present invention is mounted.

FIG. 1 schematically shows a vehicle seat 1, which is mounted, for example, on a vehicle, and a seat slide device, which slidably supports the seat 1 on a vehicle floor 2. The seat slide device includes a pair of lower rails 3 (only one of them is illustrated) and a pair of upper rails 4 (only one of them is illustrated). The lower rails 3 are fixed to the vehicle floor 2 and extend along the front-rear direction of the vehicle, and the upper rails 4 are fixed to a seat portion 5 of the vehicle seat 1. The upper rails 4 are movably assembled to the lower rails 3.

The lower rails 3 are arranged in parallel to each other and spaced at a predetermined interval along the widthwise direction of the vehicle seat 1 (the direction perpendicular to the elevation of FIG. 1). Likewise, the upper rails 4 are arranged in parallel to each other and spaced at a predetermined interval along the widthwise direction of the vehicle seat 1. FIG. 1 shows the lower rail 3 and the upper rail 4 that are arranged on the left side when facing forward of the vehicle. Movement of the upper rails 4 relative to the lower rails 3 is normally restricted by a locking member (not shown). The restriction is cancelled by applying an operating force to the locking member.

The seat slide device will now be described with reference to FIGS. 2 to 5.

Figure 2:
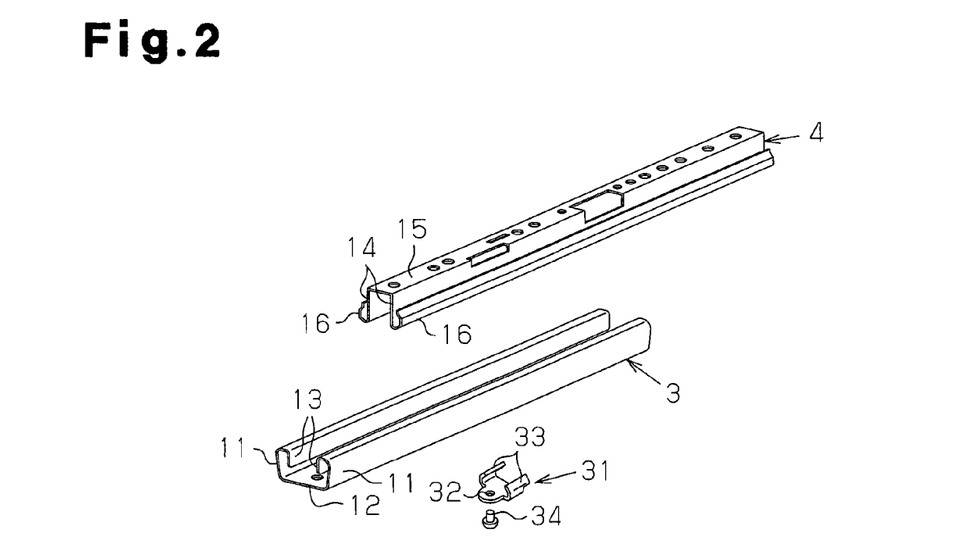
FIG. 2 is an exploded perspective view illustrating the seat slide device shown in FIG. 1.
Figure 4:
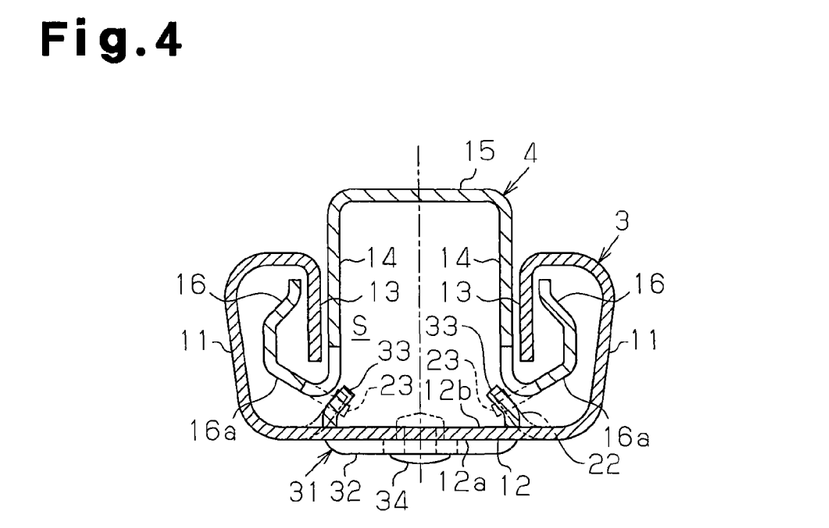
FIG. 4 is a cross-sectional view taken along line 4-4 of FIG. 3(*c*)

As shown in FIGS. 2 and 4, the lower rail 3 has a pair of side wall portions 11 formed upright at edges in the widthwise direction and a bottom wall portion (wall portion) 12 coupling the side wall portions 11 to each other. Each side wall portion 11 has at its distal edge (upper edge) a folded-back wall portion 13, which extends inward along the widthwise direction of the lower rail 3 and then is folded back toward the bottom wall portion 12.

On the other hand, the upper rail 4 has a pair of side wall portions 14 and a top wall portion 15 coupling the side wall portions 14 to each other. The side wall portions 14 are located between the folded-back wall portions 13 of the lower rail 3 and extend vertically. Each side wall portion 14 has at its distal edge (lower edge) a folded-back wall portion 16, which extends outward along the widthwise direction and then is folded back to extend between the corresponding side wall portion 11 of the lower rail 3 and the corresponding folded-back wall portion 13. The proximal portion of each folded-back wall portion 16 forms an inclined wall portion 16a, which is inclined upward in relation to the side wall portion 14.

The lower rail 3 and the upper rail 4 substantially have a U-shaped cross-section, and are engaged with each other with their openings facing each other. The lower rail 3 and the upper rail 4 are prevented from being separated in the up-down direction mainly by the engagement between the folded-back wall portions 13, 16. The cross-sectional shape defined by the lower rail 3 and the upper rail 4 is substantially rectangular. The lower rail 3 and the upper rail 4 cooperate to form an inner space S.

Rolling elements (not shown) are provided between each folded-back wall portion 16 and the facing side wall portion 11. The upper rail 4 is movable relative to the lower rail 3 along the longitudinal direction (the front-rear direction of the vehicle), while causing the rolling elements to rotate.

Figure 5:
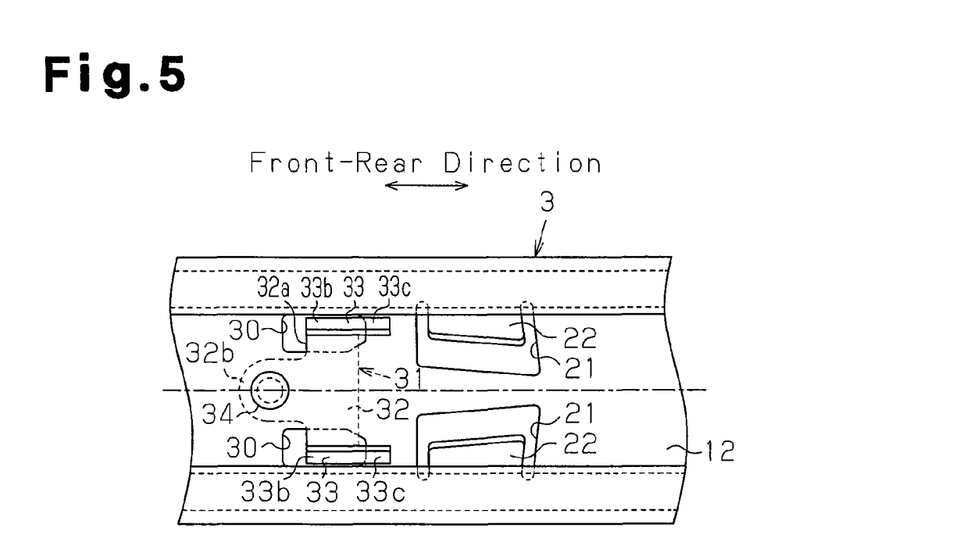
FIG. 5 is a partial plan view of the lower rail in the seat slide device shown in FIG. 1.

As shown in FIGS. 4 and 5, a pair of U-shaped cut portions 21 facing in the opposite directions are formed at a center in the longitudinal direction of the bottom wall portion 12 of the lower rail 3. Each portion of the bottom wall portion 12 enclosed by one of the cut portions 21 is bent to form a predetermined angle with respect to the bottom wall portion 12, so as to form a rectangular plate-like cut-and-raised piece 22 serving as an existing portion. Each cut-and-raised piece 22 extends along the longitudinal direction of the lower rail 3, that is, along the moving direction of the upper rail 4 relative to the lower rail 3. As shown in FIG. 4, a pair of the cut-and-raised pieces 22 are inclined relative to the bottom wall portion 12 such that the space therebetween decreases toward the distal ends (free ends).

A pair of rectangular insertion holes 30 are formed in a center portion of the bottom wall portion 12 of the lower rail 3 in the longitudinal direction. Specifically, the insertion holes 30 are at positions that are separated by a predetermined distance from the cut portions 21 toward one end (left side as viewed in FIG. 5) of the lower rail 3 in the longitudinal direction.

On the other hand, the upper rail 4 has at its either end in the longitudinal direction a pair of rectangular-plate shaped cut-and-raised pieces 23 as shown in FIG. 4. Each cut-and-raised piece 23 is formed by cutting and raising a connecting portion between a side wall portion 14 and the corresponding folded-back wall portion 16. The cut-and-raised pieces 23 at each end of the upper rail 4 extend diagonally downward along the inclined wall portions 16a, such that the space therebetween decreases from the proximal ends (the fixed ends) toward the distal ends (the free ends). As shown in FIG. 3(c), each cut-and-raised piece 23 extends along the longitudinal direction of the upper rail 4, that is, along the moving direction of the upper rail 4 relative to the lower rail 3. In the following description, the cut-and-raised pieces 23 located at one end in the longitudinal direction of the upper rail 4 (right side as viewed in FIG. 3(a)) are referred to as first cut-and-raised pieces 23a, and the cut-and-raised pieces 23 provided on the other end (left side as viewed in FIG. 3(a)) are referred to as second cut-and-raised pieces 23b. The second cut-and-raised pieces 23b function as a second stopper.

Figure 3A:
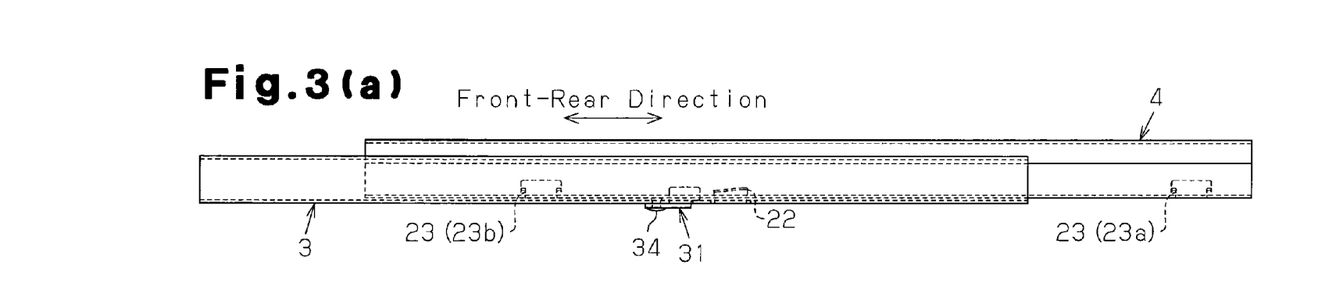
Figure 3B:
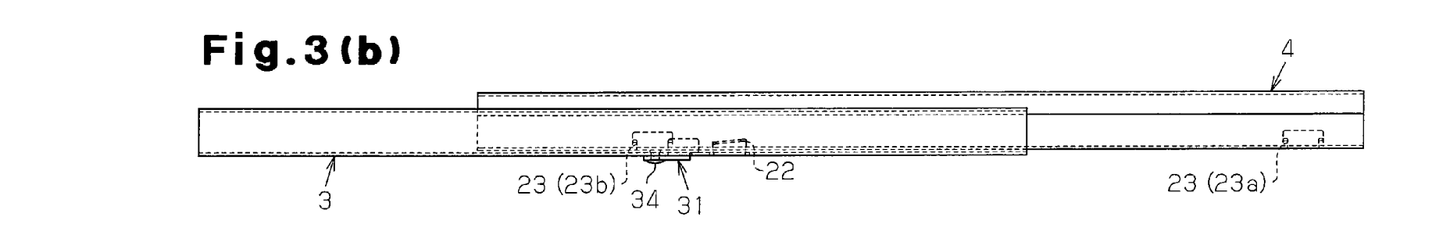
Figure 3C:
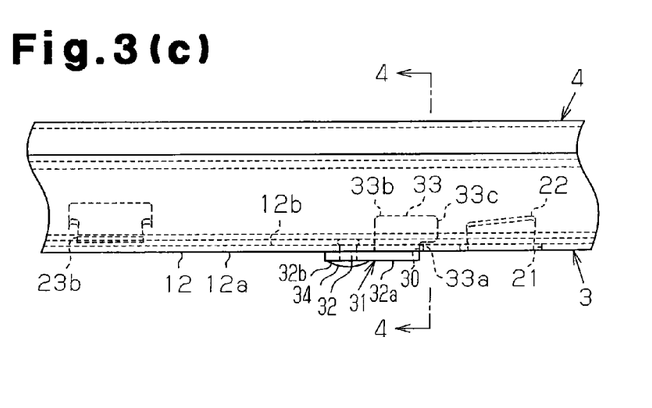

As shown in FIGS. 3(a) and 4, each cut-and-raised piece 22 and the corresponding first cut-and-raised piece 23a have facing surfaces that can contact and engage with each other along the moving direction of the upper rail 4. When each cut-and-raised piece 22 and the corresponding first cut-and-raised piece 23a are engaged with each other at the facing surfaces, the moving range of the upper rail 4 relative to the lower rail 3 is limited on a first side in the moving direction of the upper rail 4.

As shown in FIGS. 4 and 5, a stopper 31 formed by a metal plate, which serves as a first stopper, is provided on the bottom wall portion 12 of the lower rail 3. The stopper 31 includes a plate-like attachment portion 32 and a pair of flanges (movement limiting portions) 33. The attachment portion 32 contacts an outer surface 12a of the bottom wall portion 12 of the lower rail 3 and is attached to the bottom wall portion 12. The flanges 33 extend from side edges of the attachment portion 32 to be passed through the insertion holes 30. The flanges 33 are located inside the lower rail 3 (the inner space S).

As shown in FIG. 5, the attachment portion 32 includes a flat plate-like coupling piece 32a, which extends in the widthwise direction of the lower rail 3, and an extended piece 32b, which is shaped like a tongue piece extending in the longitudinal direction of the lower rail 3 from a center portion of the coupling piece 32a. The coupling piece 32a has opposite side edges in the widthwise direction of the lower rail 3, and both ends are at positions corresponding to the insertion holes 30. The extended piece 32b is located between the insertion holes 30 and extends from the center portion of the coupling piece 32a in a direction opposite to the cut-and-raised pieces 22. The attachment portion 32 is fastened (fixed) to the bottom wall portion 12 by a rivet 34, which functions as fastening means (fastening member) extending through the extended piece 32b and the bottom wall portion 12 of the lower rail 3 in the direction of the thickness.

As shown in FIG. 3(c), each flange 33 includes a proximal portion 33a connected to the corresponding side edge of the coupling piece 32a, and a rectangular plate-like flange portion 33b connected to the proximal portion 33a. The proximal portion 33a is passed through the corresponding insertion hole 30, so that the flange portion 33b is arranged inside the lower rail 3. That is, the flanges 33 are bent in relation to the attachment portion 32 so as to extend from the side edges of the attachment portion 32 (both ends in the direction intersecting the moving direction of the upper rail 4) to the interior of the lower rail 3 through the insertion holes 30. The flanges 33 extend within the lower rail 3 along the longitudinal direction of the lower rail 3. The extended piece 32b is located on a side corresponding to the second cut-and-raised piece 23b relative to the flanges 33 in the longitudinal direction of the lower rail 3. Each flange portion 33b has a length that is slightly greater than that of the insertion holes 30 and greater than that of the proximal portion 33a with respect to the longitudinal direction of the lower rail 3. Each flange portion 33b also includes a distal portion 33c, which projects toward the cut-and-raised piece 22 beyond the proximal portion 33a.

After the flange portions 33b enter the insertion holes 30 from outside of the lower rail 3, the proximal portions 33a are brought into contact with the ends of the insertion holes 30 corresponding to the cut-and-raised pieces 22. In this state, the stopper 31 is attached to the bottom wall portion 12. Therefore, the distal portions 33c of the flanges 33 project toward the cut-and-raised pieces 22 beyond the insertion holes 30 with respect to the longitudinal direction of the lower rail 3. In the present embodiment, the lower edges of the distal portions 33c contact an inner surface 12b of the bottom wall portion 12 of the lower rail 3. Also, as shown in FIG. 4, the flanges 33 have cross-sectional shapes similar to the cut-and-raised pieces 22, such that the flanges 33 at least partly overlap the cut-and-raised pieces 22 as viewed in the longitudinal direction of the lower rail 3. That is, the flanges 33 are inclined relative to the bottom wall portion 12 such that the space therebetween decreases toward the upper ends (free ends).

Each flange 33 (more specifically, each flange portion 33b) and the corresponding second cut-and-raised piece 23b have facing surfaces that can contact and engage with each other along the moving direction of the upper rail 4. The flanges 33 and the second cut-and-raised pieces 23b are engaged with each other at the facing surfaces in a shearing direction, so that the moving range of the upper rail 4 relative to the lower rail 3 is limited on a second side in the moving direction of the upper rail 4.

When the flanges 33 and the second cut-and-raised pieces 23b are engaged with each other, the load accompanying the engagement generates, in the flanges 33 located in the lower rail 3, a moment acting to rotate the distal portions 33c, which extend in a direction opposite to the second cut-and-raised pieces 23b, toward the bottom wall portion 12. However, the moment is borne by the contact between the lower edges of the distal portions 33c and the inner surface 12b of the bottom wall portion 12. Therefore, the flanges 33 are capable of more reliably bearing, in the shearing direction, the load generated by the engagement with the second cut-and-raised pieces 23b.

When the flanges 33 and the second cut-and-raised pieces 23b are engaged with each other, a moment is generated in the flanges 33, which moment acts to rotate the contacting parts of the second cut-and-raised pieces 23b away from the bottom wall portion 12. However, the moment is borne by the contact between the outer surface 12a of the bottom wall portion 12 and the extended pieces 32b, which extend toward the second cut-and-raised pieces 23b beyond the contact position at which the flanges 33 contact the second cut-and-raised pieces 23b. That is, on both sides in the longitudinal direction of the lower rail 3 with reference to the parts of the flanges 33 that contact the second cut-and-raised pieces 23b, the moment acting on the flanges 33 is borne by the cooperation of the extended pieces 32b and the distal portions 33c, which are engaged with the outer surface 12a and the inner surface 12b of the bottom wall portion 12, respectively.

The present embodiment, which is described above, has the following advantages.

(1) In the present embodiment, since the insertion holes 30 are formed at arbitrary positions of the lower rail 3 in the longitudinal direction, the above described configuration adds to the flexibility of settings of the range of relative movement of the rails 3, 4. In other words, the relative movement range can be easily changed by retrofitting the stopper 31 to ready-made rails having a predetermined relative movement range.

Also, since the stopper 31 can be attached from the outside of the lower rail 3, the stopper 31 is easily installed without being interfered by the upper rail 4 even when the stopper 31 is assembled to the lower rail 3 after the lower and upper rails 3, 4 are assembled.

(2) In the present embodiment, when the flanges 33 of the stopper 31 are engaged with the second cut-and-raised pieces 23b as the upper rail 4 is moved relative to the lower rail 3, the moment acting on the flanges 33 is borne by the engagement of the distal portions 33c with the inner surface 12b of the bottom wall portion 12. Therefore, the flanges 33 are capable of more reliably bearing, in a shearing direction, the load generated by the engagement with the second cut-and-raised pieces 23b, and ensure sufficient strength with a simple structure. This allows the flanges 33 and the second cut-and-raised pieces 23b to be small and thin, so that the size of the entire device can be reduced.

(3) In the present embodiment, the plate-like flanges 33 having an extremely simple shape are employed as a movement limiting portion.

(2) In the present embodiment, the attachment portion 32 is formed like a plate so as to reduce the projecting amount of the attachment portion 32 in relation to the lower rail 3. Also, since the attachment portion 32 and the flanges 33 are formed by bending a plate, the stopper 31 having a simple structure can be formed easily.

(5) In the present embodiment, when the stopper 31 and the second cut-and-raised pieces 23b are engaged with each other as the upper rail 4 is moved relative to the lower rail 3, the moment acting on the flanges 33 is borne by the engagement between the outer surface 12a of the bottom wall portion 12 and the extended pieces 32b, which extend toward the second cut-and-raised pieces 23b beyond the contact position at which the flanges 33 contact the second cut-and-raised pieces 23b. Therefore, the flanges 33 are capable of more reliably bearing, in a shearing direction, the load generated by the engagement with the second cut-and-raised pieces 23b.

(6) When the stopper 31 and the second cut-and-raised pieces 23b are engaged with each other as the upper rail 4 moves relative to the lower rail 3, the extended pieces 32b are pressed against the outer surface 12a of the bottom wall portion 12. Therefore, the rivet 34, which fixes the attachment portion 32 to the bottom wall portion 12, does not bear the load in a tensile direction (axial direction). Thus, the required strength of the rivet 34 is reduced, which allows the structure of the rivet 34 to be simplified.

A second embodiment of the present invention will now be described with reference to the drawings. The differences from the first embodiment will mainly be discussed below. In the present embodiment, a stopper having a structure different from that of the stopper 31 in the first embodiment is employed as a first stopper.

Figure 6A:
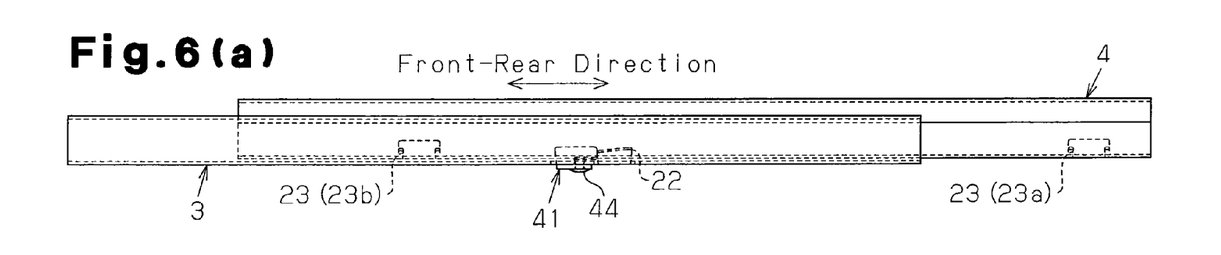
Figure 6B:
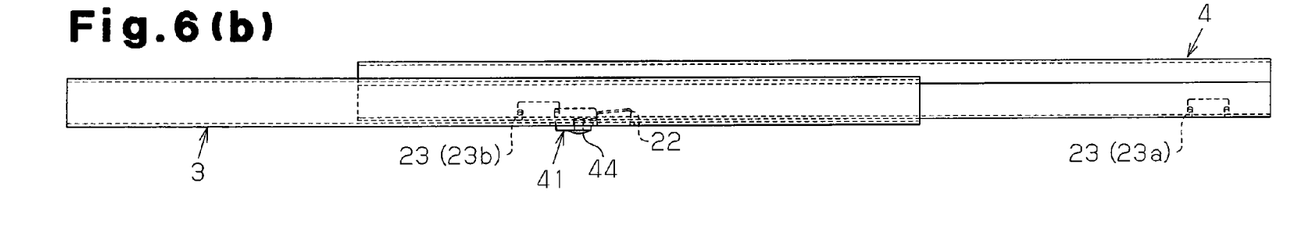
Figure 6C:
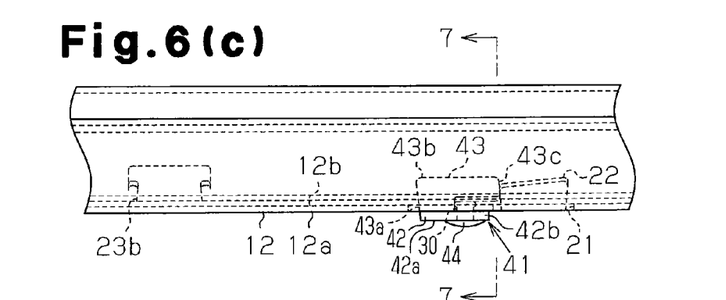
Figure 7:
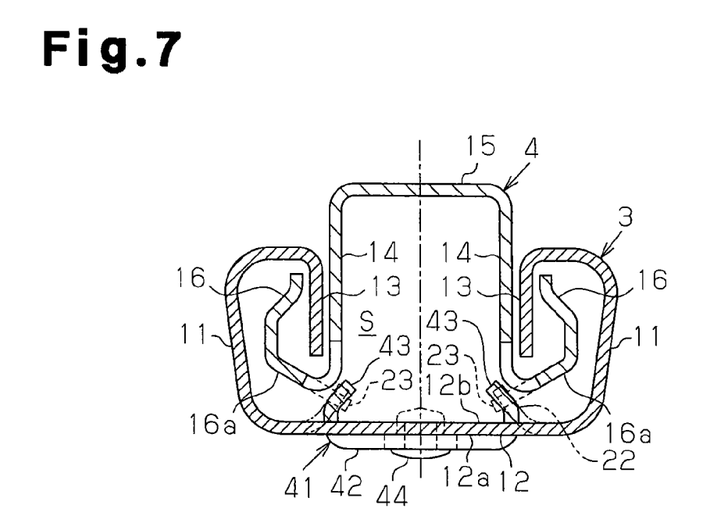
FIG. 7 is a cross-sectional view taken along line 7-7 of FIG. 6(*c*)
Figure 8:
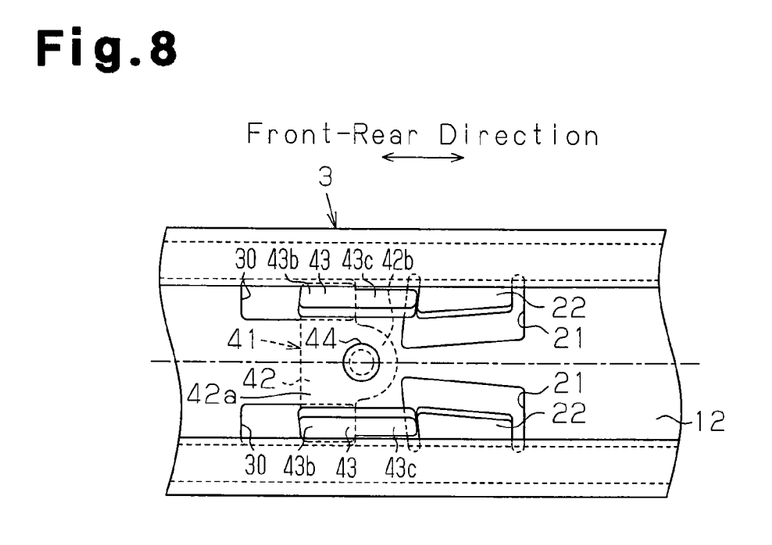
FIG. 8 is a partial plan view of the lower rail in the seat slide device shown in FIG. 6(*a*)

As shown in FIGS. 6 to 8, a stopper 41 formed by a metal plate, which serves as a first stopper is provided on the bottom wall portion 12 of the lower rail 3. The stopper 41 includes an attachment portion 42 and a pair of flanges 43. The attachment portion 42 contacts the outer surface 12a of the bottom wall portion 12 of the lower rail 3 and is attached to the bottom wall portion 12. The flanges 43 extend from side edges of the attachment portion 42 to be passed through the insertion holes 30. The flanges 43 are located inside the lower rail 3.

As shown in FIG. 8, the attachment portion 42 includes a flat plate-like coupling piece 42a, which extends in the widthwise direction of the lower rail 3, and an extended piece 42b, which is shaped like a tongue piece extending in the longitudinal direction of the lower rail 3 from a center portion of the coupling piece 42a. The coupling piece 42a has opposite side edges in the widthwise direction of the lower rail 3, and both ends are at positions corresponding to the insertion holes 30. The extended piece 42b is located between the insertion holes 30 and extends from the center portion of the coupling piece 42a toward the cut-and-raised pieces 22. The attachment portion 42 is fastened (fixed) to the bottom wall portion 12 by a rivet 44, which functions as fastening means (fastening member) extending through the extended piece 42b and the bottom wall portion 12 of the lower rail 3 in the direction of the thickness.

In contrast, as shown in FIG. 6(c), each flange 43 includes a proximal portion 43a connected to the corresponding side edge of the coupling piece 42a, and a rectangular plate-like flange portion 43b connected to the proximal portion 43a. The proximal portion 43a is passed through the corresponding insertion hole 30, so that the flange portion 43b is arranged inside the lower rail 3. Each flange portion 43b has a length that is slightly greater than that of the insertion holes 30 and greater than that of the proximal portion 43a with respect to the longitudinal direction of the lower rail 3. Each flange portion 43b also includes a distal portion 43c, which projects toward the cut-and-raised piece 22 in relation to the proximal portion 43a.

The stopper 41 is attached to the bottom wall portion 12 substantially in the same manner as the stopper 31 of the first embodiment, and the lower edges of the distal portions 43c contact the inner surface 12b of the bottom wall portion 12 of the lower rail 3. Like the stopper 31 of the first embodiment, the flanges 43 of the stopper 41 have a cross-sectional shape similar to the cut-and-raised pieces 22 described above (refer to FIG. 7). Also, each distal portion 43c and the corresponding cut-and-raised piece 22 have facing surfaces that face each other along the moving direction of the upper rail 4. In the present embodiment, these facing surfaces contact each other.

When the flanges 43 (more specifically, the flange portions 43b) and the second cut-and-raised pieces 23b, which have facing surfaces that can contact and engage with each other along the moving direction of the upper rail 4, are engaged with each other at these facing surfaces, the moving range of the upper rail 4 relative to the lower rail 3 is limited on a second side in the moving direction of the upper rail 4.

When the flanges 43 and the second cut-and-raised pieces 23b are engaged with each other, the moment acting on the flanges 43, which are located inside the lower rail 3, is borne by the contact between the lower edges of the distal portions 43c and the inner surface 12b of the bottom wall portion 12. Therefore, the flanges 43 are capable of more reliably bearing, in the shearing direction, the load generated by the engagement with the second cut-and-raised pieces 23b. Specifically, the flanges 43 transmit the load generated by the engagement with the second cut-and-raised pieces 23b to the cut-and-raised pieces 22, which contact the distal portions 43c of the flanges 43b. Accordingly, the load generated by the engagement between the flanges 43 and the second cut-and-raised pieces 23b is borne by the flange portions 43b and the cut-and-raised pieces 22 in a dispersed manner.

The present embodiment described above provides the following advantages in addition to the advantages (1) to (4), and (6) of the first embodiment.

(7) In the present embodiment, the flanges 43 contact the cut-and-raised pieces 22 of the lower rail 3 on a side opposite to the second cut-and-raised pieces 23b with respect to the direction of the relative movement between the lower rail 3 and the upper rail 4. Accordingly, the load generated by the engagement between the flanges 43 and the second cut-and-raised pieces 23b is borne by both of the flanges 43 and the cut-and-raised pieces 22 in a dispersed manner. Thus, the required strength of the flanges 43 (the stopper 41) is reduced, which allows the structure of the flanges 43 to be simplified.

A third embodiment of the present invention will now be described with reference to the drawings. The differences from the first embodiment will mainly be discussed below. In the present embodiment, a stopper having a structure different from that of the stopper 31 in the first embodiment is employed as a first stopper.

Figure 9:
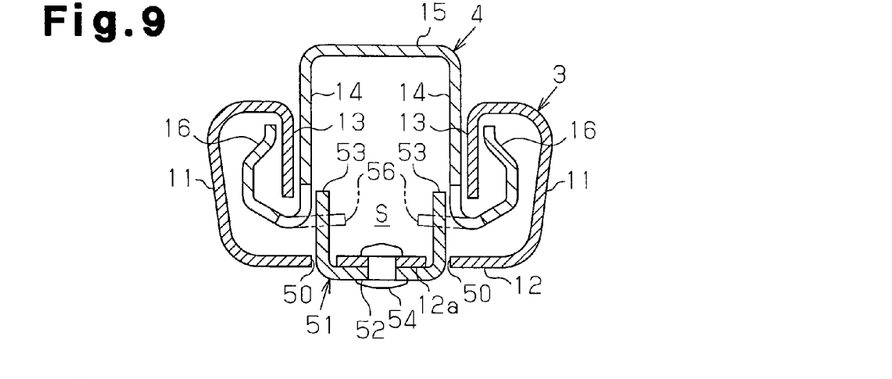
FIG. 9 is a cross-sectional view illustrating a seat slide device according to a third embodiment of the present invention.
Figure 10:
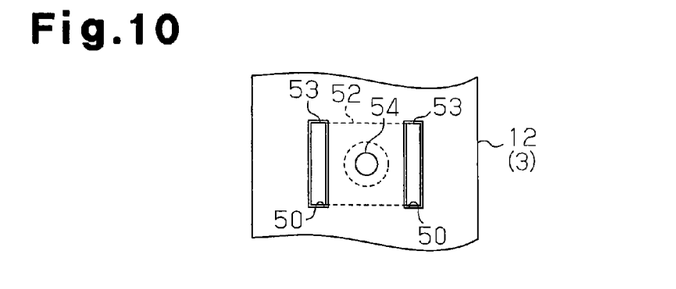
FIG. 10 is a partial plan view of the lower rail in the seat slide device shown in FIG. 9.

As shown in FIGS. 9 and 10, a pair of rectangular insertion holes 50 are formed on both sides in the widthwise direction of the bottom wall portion 12 of the lower rail 3.

Figure 11:
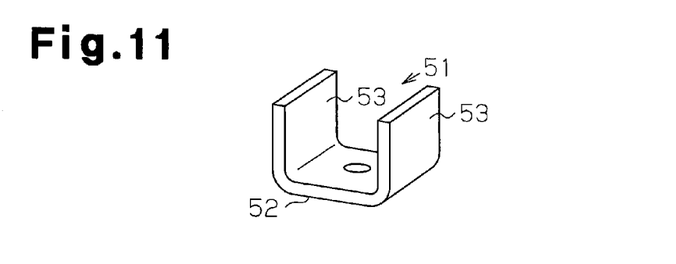
FIG. 11 is a perspective view of the stopper in the seat slide device shown in FIG. 9.

A stopper 51 formed by a metal plate, which serves as a first stopper, is provided on the bottom wall portion 12 of the lower rail 3. As also shown in FIG. 11, the stopper 51 is formed to have a U-shaped cross-sectional shape. The stopper 51 includes an attachment portion 52 and a pair of flanges 53. The attachment portion 52 contacts the outer surface 12a of the bottom wall portion 12 of the lower rail 3 and is attached to the bottom wall portion 12. The flanges 53 extend from side edges of the attachment portion 52 to be passed through the insertion holes 50. The flanges 53 are located inside the lower rail 3. The flanges 53 are perpendicular to the attachment portion 52.

The attachment portion 52 is fastened (fixed) to the bottom wall portion 12 by a rivet 54, which functions as fastening means (a fastening member) extending through the attachment portion 52 and the bottom wall portion 12 of the lower rail 3 in the direction of the thickness.

On the other hand, each flange 53 extends perpendicular to the bottom wall portion 12. The distance between the flanges 53 is set shorter than the distance between the side wall portions 14 of the upper rail 4. Each flange 53 includes an proximal portion that is connected to the attachment portion 52 and passed through the corresponding insertion hole 50. The flange 53 has a length that is slightly less than that of the insertion hole 50 with respect to the longitudinal direction of the lower rail 3.

In place of the second cut-and-raised pieces 23b of the first embodiment, the upper rail 4 includes cut-and-raised pieces 56 serving as a second stopper extending substantially horizontally as shown in FIG. 9. The flange 53 and the cut-and-raised piece 56 have facing surfaces that can contact and engage with each other along the moving direction of the upper rail 4. The flanges 53 and the cut-and-raised pieces 56 are engaged with each other at the facing surfaces, so that the moving range of the upper rail 4 relative to the lower rail 3 is limited on a second side in the moving direction of the upper rail 4.

The present embodiment described above has the same advantages as the advantages (1), (3), and (4) of the first embodiment.

A fourth embodiment of the present invention will now be described with reference to the drawings. The differences from the third embodiment will mainly be discussed below.

Figure 12:
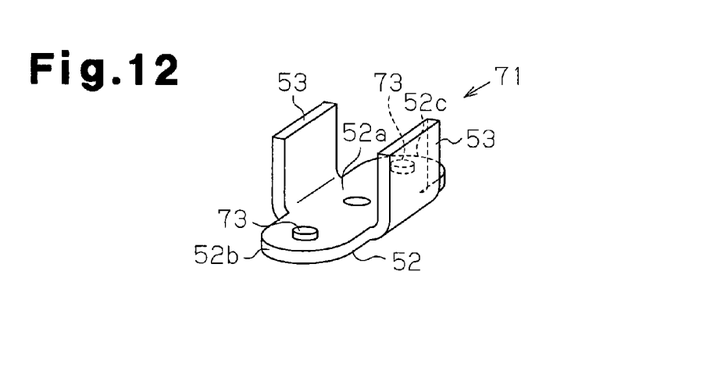
FIG. 12 is a perspective view illustrating a stopper according to a fourth embodiment of the present invention.

In the present embodiment, a stopper 71 shown in FIG. 12 is employed as a first stopper. The stopper 71 of the present embodiment is formed by providing the stopper 51 of the third embodiment with a pair of extended pieces 52b, 52c. That is, as shown in FIG. 12, an attachment portion 52 of the stopper 71 includes a flat plate-like coupling piece 52a and the first and second extended pieces 52b, 52c. The first and second extended pieces 52b, 52c are extended beyond the flanges 53 from the front end and the rear end of the coupling piece 52a in a direction of relative movement of the rails 3, 4. The extended pieces 52b, 52c contact the outer surface 12a of the bottom wall portion 12.

Figure 13:
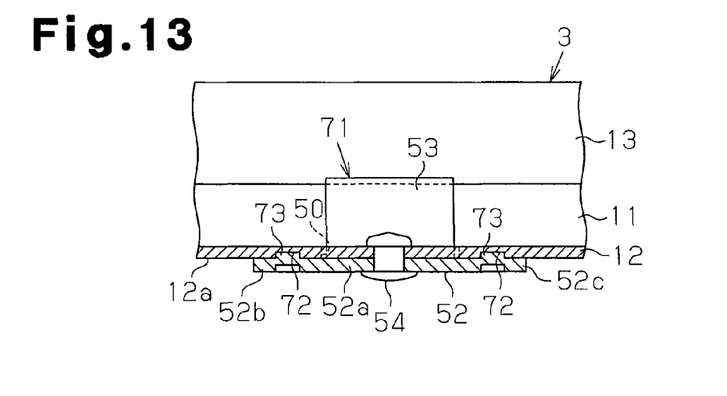
FIG. 13 is a partial cross-sectional view of a lower rail having the stopper shown in FIG. 12.

As shown in FIG. 13, the attachment portion 52 is fastened (fixed) to the bottom wall portion 12 of the lower rail 3 by a rivet 54, which serves as fastening means (a fastening member), at the coupling piece 52a, which is a portion between the extended pieces 52b, 52c. Through hole for receiving the rivet 54 is formed in each of the coupling piece 52a and the bottom wall portion 12.

The attachment portion 52 is fitted to the bottom wall portion 12 by a projection/recess fitting structure at each of the first and second extended pieces 52b, 52c. The projection/recess fitting structure includes recesses 72 formed in the outer surface 12a of the bottom wall portion 12 and projections 73 formed on the first and second extended pieces 52b, 52c to be fitted in the recesses 72. The projection/recess fitting structure is formed by pressing, more specifically, half blanking. Recesses are formed in the first and second extended pieces 52b, 52c through the half blanking.

The recesses 72 may be formed at the boundaries between the extended pieces 52b, 52c and the coupling piece 52a. That is, the recesses 72 may be formed at any positions that include at least parts of the extended pieces 52b, 52c.

The present embodiment has the same advantages as the advantages (1), (3), (4), and (5) of the first embodiment.

Next, a fifth embodiment of the present invention will now be described with reference to the drawings. The differences from the fourth embodiment will mainly be discussed below.

Figure 14:
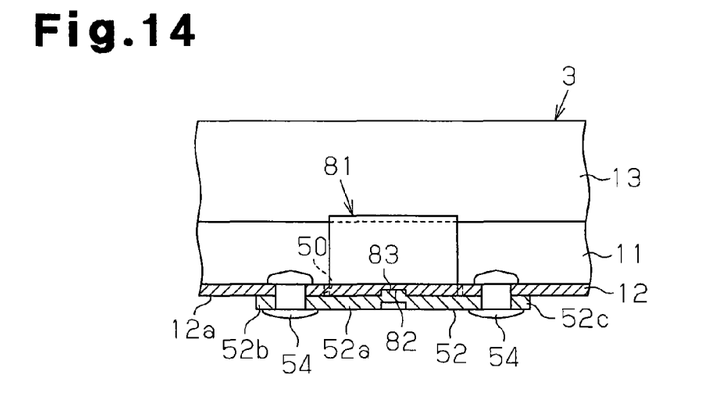
FIG. 14 is a partial cross-sectional view illustrating a lower rail having a stopper according to a fifth embodiment of the present invention.

In the present embodiment, a stopper 81 shown in FIG. 14 is employed as a first stopper. The stopper 81 of the present embodiment is different from the stopper 71 of the fourth embodiment in the following points. That is, the attachment portion 52 is fastened (fixed) to the bottom wall portion 12 of the lower rail 3 by rivets 54, which functions as fastening means (a fastening member), at the first and second extended pieces 52b, 52c. Through holes for receiving the rivets 54 are formed in the extended pieces 52b, 52c and the bottom wall portion 12.

The attachment portion 52 is fitted to the bottom wall portion 12 by a projection/recess fitting structure at the coupling piece 52a, which is a part between the extended pieces 52b, 52c. The projection/recess fitting structure includes a recess 82 formed in the outer surface 12a of the bottom wall portion 12 and a projection 83 formed on the coupling piece 52a to be fitted in the recess 82. As in the fourth embodiment, the projection/recess fitting structure is formed by pressing, more specifically, half blanking. A recess is formed in the coupling piece 52a through the half blanking.

The through holes for receiving the rivets 54 may be formed at the boundaries between the extended pieces 52b, 52c and the coupling piece 52a in the attachment portion 52. That is, the through holes may be formed at any positions that include at least parts of the extended pieces 52b, 52c.

The present embodiment has the same advantages as the advantages (1), (3), (4), (5), and (6) of the first embodiment.

The above embodiments may be modified as follows.

Figure 15:
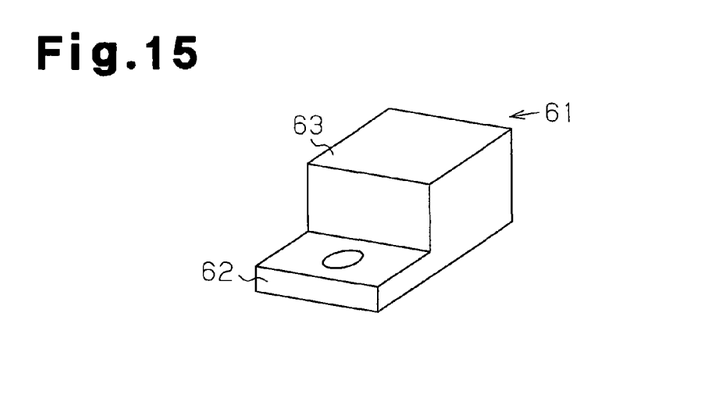
FIG. 15 is a perspective view illustrating a stopper according to a modified embodiment of the present invention.

A stopper 61 shown in FIG. 15 may be employed as a first stopper. The stopper 61 includes an attachment portion 62 and a block 63 shaped as a rectangular parallelepiped. The block 63 extends from the attachment portion 62 and functions as a movement limiting portion. The stopper 61 is attached to the bottom wall portion 12 in such a manner that the attachment portion 62 contacts the outer surface 12a of the bottom wall portion 12 of the lower rail 3. The block 63 is arranged in the inner space S of the seat slide device by being passed through a insertion hole formed in the bottom wall portion 12.

In the second embodiment, the extended piece 42b may be formed to extend toward the second cut-and-raised piece 23b beyond the contact position at which the flanges 43 contact the second cut-and-raised piece 23b. In this case also, the attachment portion 42 is fastened (fixed) to the bottom wall portion 12 at a part of the extended piece 42b by fastening means (a fastening member).

In the second embodiment, each flange 43 may contact an existing portion such as a fastener bolt provided in the lower rail 3 at a position opposite to the second cut-and-raised pieces 23b in the moving direction of the upper rail 4.

In each of the illustrated embodiments, a second stopper (23b, 56) may be provided in the lower rail 3, and a first stopper (31, 41, 51, 61, 71, 81) may be provided in the upper rail 4. That is, a first stopper may be retrofitted to the top wall portion (wall portion) of the upper rail 4, so as to be engaged with a second stopper provided in the lower rail 3.

In each of the illustrated embodiments, two or more insertion holes (30, 50) for receiving the first stopper (31, 41, 51, 61, 71, 81) may be formed in the bottom wall portion 12 of the lower rail 3 along the longitudinal direction of the lower rail 3 in advance, so that the movable range of the upper rail 4 relative to the lower rail 3 can be selected from multiple ranges.

In each of the illustrated embodiments, the rivets 34, 44, 54 may be replaced by a set of bolt and nut or a self-tapping screw functioning as fastening means (a fastening member).

In each of the illustrated embodiments, the cut-and-raised pieces 23, 56 formed in the upper rail 4 may be replaced by a separately formed stopper (second stopper) having a similar function.

Each of the illustrated embodiments may be configured with a single lower rail 3 and a single upper rail 4 provided in the seat portion 5. Alternatively, three or more lower rails 3 and the corresponding number of upper rails 4 may be provided in the seat portion 5.

In each of the illustrated embodiments, the direction in which the seat is moved when the upper rail is moved relative to the lower rail may be the widthwise direction of the vehicle.

The invention claimed is:

1. A seat slide device for a vehicle comprising:
at least one first rail adapted to be fixed to one of a vehicle floor and a vehicle seat, the first rail including a wall portion having a pair of insertion holes arranged in a widthwise direction of the first rail;
at least one second rail adapted to be fixed to the other one of the vehicle floor and the vehicle seat, wherein the second rail is assembled to the first rail so as to be slidingly movable relative to the first rail,
a first stopper having a pair of movement limiting portions, the movement limiting portions extending through the insertion holes; and
a second stopper provided on the second rail,
wherein the movement limiting portions are arranged to be contactable with the second stopper in a direction of relative movement between the first rail and the second rail, wherein, by being engaged with the second stopper, the movement limiting portions limit a relative movement between the first and second rails,
wherein the movement limiting portion includes a pair of plate-like flanges, each of which is passed through one of the insertion holes and extends along the direction of the relative movement between the first and second rails.

2. The seat slide device according to claim 1,
wherein the pair of plate-like flanges is formed integrally with the first end stop, and wherein the insertion hole is formed as a slot having rectangular shape.

3. The seat slide device according to claim 1, wherein
the first stopper has an attachment portion, the attachment portion contacting an outer surface of the wall portion of the first rail to be attached to the wall portion, the movement limiting portions being formed integrally with the attachment portion and extending from side edges of the attachment portion through the insertion holes to be located in an inner space formed between the first rail and the second rail,
wherein the attachment portion is formed like a plate and has the side edges in a direction intersecting the direction of the relative movement between the first and second rails,
wherein each flange is bent in relation to the attachment portion by an angle of 90° or 135° so as to extend from the corresponding side edge of the attachment portion and to be passed through the corresponding insertion hole, and
wherein the lateral region of the flanges extending through the insertion hole cooperates with the second stopper.

4. The seat slide device according to claim 1,
wherein the second rail has at its either end in the longitudinal direction a pair of rectangular-plate shaped cut-and-raised pieces, and wherein each cut-and-raised piece is formed by cutting and raising a connecting portion between a side wall portion of the second rail and the corresponding folded-back wall portion of the second rail.

5. The seat slide device according to claim 3,
wherein the both flanges are bent in relation to the attachment portion by an angle of approximately 90° so that the ends of the flanges are arranged parallel to one another.

6. The seat slide device according to claim 3,
wherein the attachment portion has an opening for fastening means and a projection arranged along the central longitudinal line of the attachment portion.

7. The seat slide device according to claim 6,
wherein the opening is arranged centrally between the flanges in width direction of the first rail.

8. The seat slide device according to claim 3,
wherein the attachment portion has a projection, and wherein the attachment portion is fitted to the wall portion of the first rail by means of the projection engaged to a recess configured in the first rail.

9. The seat slide device according to claim 3,
wherein the attachment portion is fastened to the bottom wall portion of the first rail by rivets, a set of bolt and nut or a self-tapping screw functioning as fastening means.

10. The seat slide device according to claim 3,
wherein the attachment portion and the flanges are formed by bending a plate and the projection is formed by pressing.

11. A vehicle seat, comprising a seat slide device the seat slide device comprising:
at least one first rail adapted to be fixed to one of a vehicle floor and a vehicle seat, the first rail including a wall portion having a pair of insertion holes arranged in a widthwise direction of the first rail;
at least one second rail adapted to be fixed to the other one of the vehicle floor and the vehicle seat, wherein the second rail is assembled to the first rail so as to be slidingly movable relative to the first rail,
a first stopper having a pair of movement limiting portions, the movement limiting portions extending through the insertion holes; and
a second stopper provided on the second rail,
wherein the movement limiting portions are arranged to be contactable with the second stopper in a direction of relative movement between the first rail and the second rail, wherein, by being engaged with the second stopper, the movement limiting portions limit a relative movement between the first and second rails,
wherein the movement limiting portion includes a pair of plate-like flanges, each of which is passed through one of the insertion holes and extends along the direction of the relative movement between the first and second rails.

12. The vehicle seat according to claim 11,
wherein the pair of plate-like flanges is formed integrally with the first end stop, and wherein the insertion hole is formed as a slot having rectangular shape.

13. The vehicle seat according to claim 11, wherein the first stopper has an attachment portion, the attachment portion contacting an outer surface of the wall portion of the first rail to be attached to the wall portion, the movement limiting portions being formed integrally with the attachment portion and extending from side edges of the attachment portion through the insertion holes to be located in an inner space formed between the first rail and the second rail,
wherein the attachment portion is formed like a plate and has the side edges in a direction intersecting the direction of the relative movement between the first and second rails,
wherein each flange is bent in relation to the attachment portion by an angle of 90° or 135° so as to extend from the corresponding side edge of the attachment portion and to be passed through the corresponding insertion hole, and
wherein the lateral region of the flanges extending through the insertion hole cooperates with the second stopper.

14. The vehicle seat according to claim 13,
wherein the attachment portion has an opening for fastening means and a projection arranged along the central longitudinal line of the attachment portion, and
wherein the opening is arranged centrally between the flanges in width direction of the first rail.

15. The vehicle seat according to claim 13,
wherein the attachment portion has a projection, and
wherein the attachment portion is fitted to the wall portion of the first rail by means of the projection engaged to a recess configured in the first rail.

* * * * *